US006002770A

United States Patent [19]

[11] Patent Number: 6,002,770
[45] Date of Patent: *Dec. 14, 1999

Tomko et al.

[54] METHOD FOR SECURE DATA TRANSMISSION BETWEEN REMOTE STATIONS

[75] Inventors: George J. Tomko, East York; Alexei Stoianov, Toronto, both of Canada

[73] Assignee: Mytec Technologies Inc., Ontario, Canada

[ * ] Notice: This patent is subject to a terminal disclaimer.

[21] Appl. No.: 08/931,028

[22] Filed: Sep. 15, 1997

Related U.S. Application Data

[63] Continuation-in-part of application No. 08/584,375, Jan. 8, 1996, Pat. No. 5,737,420, which is a continuation-in-part of application No. 08/508,978, Jul. 28, 1995, Pat. No. 5,712,912.

[51] Int. Cl.[6] .............................. H04L 9/00; H04K 1/00; G09C 3/00

[52] U.S. Cl. .................................... 380/44; 380/3; 380/4; 380/21; 380/23; 380/49; 380/54

[58] Field of Search .............................. 380/23, 4, 3, 21, 380/44, 49, 54

[56] References Cited

U.S. PATENT DOCUMENTS 5,541,994 7/1996 Tomko et al. ............................ 380/30
5,737,420 4/1998 Tomko et al. ............................ 380/23

*Primary Examiner*—Tod R. Swann
*Assistant Examiner*—Hrayr A. Sayadian
*Attorney, Agent, or Firm*—Marshall, O'Toole, Gerstein, Murray & Borun

[57] ABSTRACT

A method for permitting the secure handling of data between two remote stations firstly involves the generation of an encrypted decryption key which is based on a fingerprint information signal from a user of a first station, a fingerprint information signal from a user of a second station, and a key representing function derived from a random key. The encrypted decryption key is of the type with the property that when it is written to a spatial light modulator (SLM) of an optical correlator, the output of the correlator is similar when input with either one of the fingerprint information signals. The encrypted key is then stored at both stations. Thereafter a message encrypted with the key may be decrypted at either station by retrieving the encrypted key, writing the encrypted key to a filter of an optical correlator, inputting one of the fingerprint information signals to the correlator in order to allow recovery of the decryption key, and applying the decryption key to the encrypted message.

13 Claims, 2 Drawing Sheets

METHOD FOR SECURE DATA TRANSMISSION BETWEEN REMOTE STATIONS

CROSS-REFERENCE TO RELATED APPLICATIONS

This application is a continuation-in-part of application no. Ser. No. 08/584,375 filed Jan. 8, 1996 now U.S. Pat. No. 5,737,420 which is a continuation-in-part of application Ser. No. 08/508,978 filed Jul. 28, 1995 now U.S. Pat. No. 5,712,912.

BACKGROUND OF THE INVENTION

1. Field of the Invention

The present invention provides a method for permitting the secure passing of data between two remote stations.

2. Background of the Invention

While use of the internet has increased rapidly, concerns for the privacy and security of data transferred over the internet have remained. The present invention seeks to provide a method for permitting the secure handling of data between remote stations, such as remote computers hooked to the internet.

SUMMARY OF THE INVENTION

In accordance with the present invention, there is provided a method for permitting the secure passing of data between two remote stations, comprising the steps of: obtaining from a user of a first of two remote stations, a first characteristic information signal; obtaining from a user of a second of two remote stations, a second characteristic information signal; generating a sequence of random characters to obtain a random key; obtaining a key function which represents said key; obtaining a Fourier transform of said key representing function; obtaining at least one encrypted version of said key based on said Fourier transform of said key representing function, and at least one of said first characteristic information signal, and said second characteristic information signal such that said key may be recovered by writing said at least one encrypted version of said encrypted key to a correlator and inputting either one of said first characteristic information signal and said second characteristic information signal to said correlator; storing at least one of said encrypted version of said key at each of said first station and said second station, whereby thereafter any message encrypted in such a way that it may be decrypted by said key may be decrypted at either of said two remote stations by retrieving said stored encrypted key, writing said encrypted key to a correlator and inputting either one of said first characteristic information signal and said second characteristic information signal to said optical correlator.

In accordance with another aspect of the present invention, there is provided a method for the secure handling of data between two remote stations, comprising the steps of: at a base station, encrypting a message such that said message may be decrypted by a decryption key; passing said message to a remote station; at said remote station, obtaining from a user of said remote station an optical characteristic information signal; retrieving from storage an encrypted version of said decryption key, said encrypted decryption key having the property that when it is written to a correlator, the output of said correlator is similar when input with either one of said first or said second characteristic information signal; writing a remote station correlator with said encrypted decryption key; inputting said remote station correlator with a Fourier transform of said remote station user optical characteristic information signal; regenerating said decryption key from an output of said remote station correlator; and decrypting said message with said decryption key.

DETAILED DESCRIPTION OF THE PREFERRED EMBODIMENTS

Figure 1:
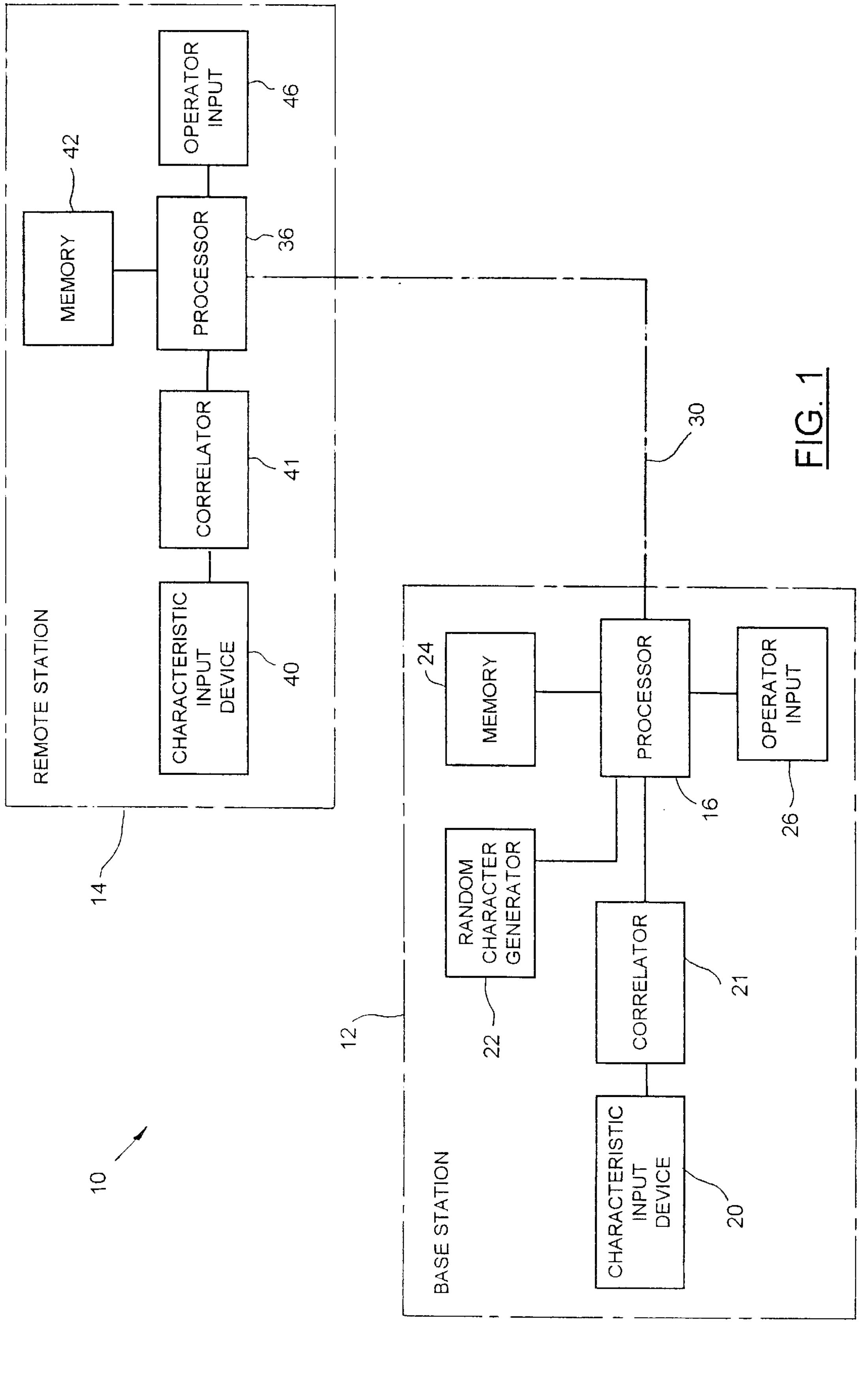
FIG. 1 is a schematic view of a system for use in the secure handing of data between two remote stations made in accordance with this invention.

Turning to FIG. 1, a system indicated generally at 10 for permitting the secure passing of data between two remote stations, comprises a base station indicated generally at 12 and a remote station indicated generally at 14. The base station comprises a processor 16 linked to a correlator 21, a random character generator 22, a memory 24, and an operator input device 26. The correlator 21 is optically linked to a characteristic input device 20. The processor 16 of the base station 12 is connected for two-way communication with a processor 36 of remote station 14 on line 30. The processor 36 of the remote station is linked to a correlator 41, a memory 42, and an operator input device 46. The correlator 41 is optically linked to a characteristic input device 40.

Figure 2:
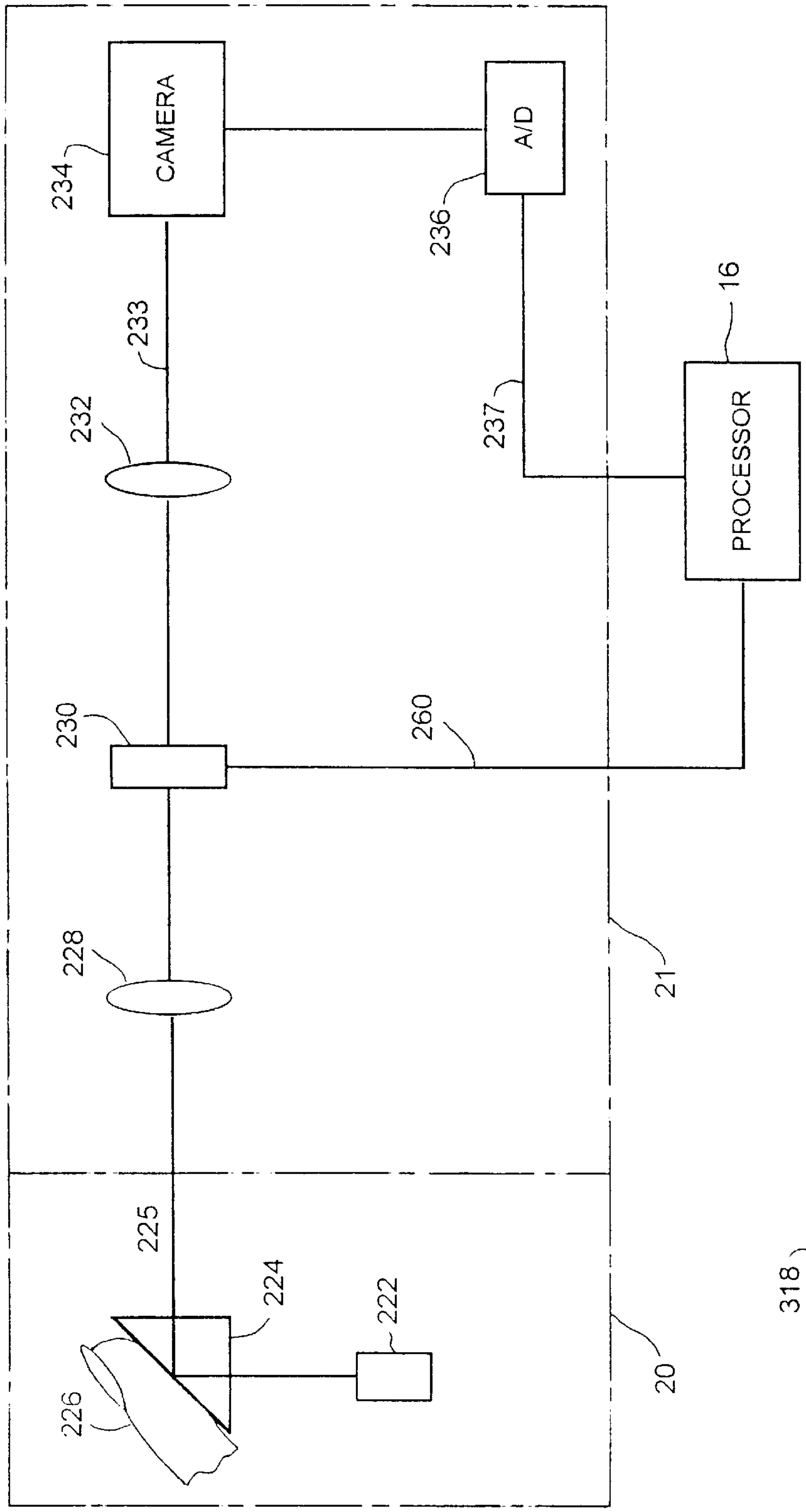
FIG. 2 is a schematic detail of a portion of FIG. 1.

The characteristic input device 20 and correlator 21 of base station 12 are detailed in FIG. 2. Turning to FIG. 2, input device 20 comprises a source of coherent light 222 and input prism 224 with an optical output 225 to correlator 21. The correlator 21 comprises a Fourier transform lens 228, a full-complex spatial light modulator (SLM) 230, an inverse Fourier transform lens 232, a CCD camera 234 with an A\D convertor 236 outputting to processor 16 on line 237. The processor outputs to the input of SLM 230 on line 260. The characteristic input device 40 and correlator 41 of remote station 14 may be identically constructed.

System 10 is used, firstly, to develop an encrypted version of a message decryption key at the base station which may be transmitted to the remote station without concern for privacy and, subsequently, to encrypt messages at either of the stations for transmission to other of the stations where they may be decrypted.

(i) Developing an encrypted decryption key

Assuming the user of base station 12 wishes to communicate in a secure fashion with the user of remote station 14, the user of the base station first agrees upon a temporary secret key with the user of the remote station. This secret key can, for example, be based on a Diffie-Hellman key derivation, an exponential key derivation scheme or public key system. The user of the remote station then utilizes input device 40 to develop an information signal impressed with characteristics peculiar to the remote station user. With the input device 40 and correlator 41 configured as shown in FIG. 2, the remote station user activates the light source of the input device and causes the processor 36 to make the SLM of the correlator transparent so that the correlator is effectively bypassed. Next the remote station user places his finger on the input prism creating an optical signal impressed with characteristics of the fingerprint of the user. This optical characteristic signal is imaged at the camera. This characteristic information signal is then digitized and passed to the processor 36. The previously agreed upon secret key is used to encode the digitized fingerprint and this encrypted fingerprint may then be passed to the base station 12 on line 30.

At the base station 12, referencing FIG. 2, the base station user may activate light source 222 and cause processor 16 to make SLM 230 transparent. The base station user may then place his fingerprint 226 on the input prism so that a fingerprint (characteristic) information signal is imaged at the camera 234. The digitized version of this signal is then passed to processor 16. Returning to FIG. 1, the processor decrypts the fingerprint information signal from the remote station utilizing the previously agreed upon method to generate a temporary secret key, which may either be derived by processor 16 and stored in memory 24 or input directly from the operator input 26. Next the processor 16 numerically determines spatial Fourier transforms of the remote station fingerprint information signal and the base station fingerprint information signal.

The processor now prompts random character generator 22 to generate a sequence of random characters which will comprise a decryption key. The processor 16 then develops a key function which represents the key. For example, the key representing function could be developed by applying each character of the decryption key as a coefficient to a set of normalized orthogonal basis functions, preferably, delta-shaped functions. The processor then numerically calculates a Fourier transform of the key representing function.

Next, the processor obtains an encrypted version of the decryption key. In the first embodiment of the invention, this step includes developing a composite filter based on the remote station fingerprint information signal, the base station fingerprint information signal, and the key representing function. This composite filter has the property that when it is written to the SLM, the output of the correlator is similar when input with either the remote station fingerprint information signal or the base station fingerprint information signal. Preferably, this output is a set of narrow peaks, the positions of which correspond to the maxima of the delta-shaped basis functions. Methods of obtaining a composite filter with these properties are known to those skilled in the art and described in, for example, an article entitled "Tutorial Survey of Composite Filter Designs for Optical Correlators" by B. V. K. Vijaya Kumar, *Applied Optics,* Volume 31, No. 23, pages 4773 to 4801. Briefly, the composite filter may be constructed as a linear combination of the complex conjugate Fourier transforms of the remote station fingerprint information signal and the base station fingerprint information signal multiplied by the Fourier transform of the key representing function. The coefficients of the linear combination are determined from a set of equations derived in accordance with certain criteria.

To illustrate the process of composite filter development, let us consider a case of two fingerprints, $f_1(x)$ and $f_2(x)$, where $f_1(x)$ and $f_2(x)$ are the base and the remote station fingerprint information signals, respectively (we use a one-dimensional spatial coordinate system for simplicity). The Fourier transforms of these signals are $F_1(q)$ and $F_2(q)$ respectively, where q is a coordinate in a Fourier domain.

The key representing function may be written as $$k(x)=\sum_{n=1}^{N}k_n\delta(x-x_n),$$

where δ( ) is a delta-function; $x_n$ are the coordinates of the narrow peaks and N is the number of the peaks; $k_n$ are numerical coefficients. The Fourier transform of the key representing function is $$K(q)=\sum_{n=1}^{N}k_n\exp(-iqx_n)$$

The composite filter, H(q), may be presented in the form $$H(q)=K(q)(C_1F_1^*(q)+C_2F_2^*(q)),$$

where coefficients $C_1$, $C_2$ should be determined; "*" means complex conjugation. If this filter is put on a SLM and the SLM is illuminated with the signal $f_1(x)$, we will get a correlation function, $B_1(x)$, at the output of the correlator, and a correlation function $B_2(x)$ for the signal $f_2(x)$. For the correlation functions we have:

$$B_1(x)=(1/2\pi)C_1\sum_{n=1}^{N}k_n\int F_1(q)F_1^*(q)\exp(iq(x-x_n))dq+(1/2\pi)C_2\sum_{n=1}^{N}k_n\int F_1(q)F_2^*(q)\exp(iq(x-x_n))dq,$$

$$B_2(x)=(1/2\pi)C_1\sum_{n=1}^{N}k_n\int F_2(q)F_1^*(q)\exp(iq(x-x_n))dq+(1/2\pi)C_2\sum_{n=1}^{N}k_n\int F_2(q)F_2^*(q)\exp(iq(x-x_n))dq$$

Substituting $x=x_n$, n=1, 2, . . . N into the equations and setting, for example, the sums $\Sigma B_1(x_n)$, $\Sigma B_2(x_n)$ equal to certain values, we can obtain as many algebraic equations as necessary to find the unknown variables $C_1$, $C_2$, $k_n$ and to develop the composite filter. To make sure that the number of the equations equals the number of the unknown coefficients, one can use different criteria. For example, a sum (or a sum of squares, or a product, etc.) of the heights of the output narrow peaks is set equal to a certain value. In another embodiment, the height of each peak is set equal to a certain value, but in this case both users (i.e. at the base station and at the remote station) record a few fingerprint information signals, that is, the number of the signals equals or exceeds the number of the peaks in the key representing function.

In the second embodiment of the invention, the step of obtaining an encrypted version of the decryption key includes dividing the Fourier transform of the key representing function by the Fourier transform of the base station fingerprint information signal to obtain a first filter, and dividing the Fourier transform of the key representing function by the Fourier transform of the remote station fingerprint information signal to obtain a second filter. A concatenation of the two filters can now be stored and this yields the encrypted version of the decryption key for both base and remote station fingerprint information signal.

The encrypted version of the decryption key may be stored in memory 24. Also, because the decryption key is encrypted, it may be passed to the remote station on line 30 and will remain secure even if intercepted. The remote station stores the received encrypted decryption key in its memory 42.

In a third embodiment, the decryption key generated by the base station is encrypted by the temporary secret key and transmitted to the remote station over line 30. Each station may then develop a key representing function using the techniques aforedescribed. Then each station develops a filter based on the developed key representing function and the characteristic information signal of that station, again using techniques as aforedescribed. A number of alternative approaches for generating both key representing functions and filters are described in U.S. patent application Ser. No. 08/508,978 filed Jul. 28, 1995 and PCT/CA95/00509 filed Sep. 6, 1995, the disclosures of which are incorporated herein by reference.

(ii) Sending messages

Once an encrypted version of the decryption key is present at both the base and remote stations, encrypted messages may be sent from either station to the other and decrypted by the recipient station. For example, if the base station user wished to send an encrypted message to the remote station, he could obtain the decryption key by applying his fingerprint to the characteristic input device 20 and prompting processor 16 to write SLM 230 with the encrypted decryption key. This will return the key representing function at camera 234 from which the key can be extracted by the processor. The base station user may then input a message by way of operator input 26 which message may be encrypted with the decryption key and the encrypted message sent on line 30 to the remote station.

In the second embodiment of the invention, the processor 16 writes to the SLM each of the previously concatenated two filters of the encrypted decryption key either in sequence or simultaneously. If the fingerprint is the same as was used at the base station during developing the encrypted decryption key, the camera 234 will register a set of narrow peaks in the case of the first filter and a random pattern in the case of the second filter. The positions of the peaks correspond to the maxima of the delta-shaped basis functions and, thus, determine the decryption key.

At the remote station, the remote user may prompt processor 36 to retrieve the encrypted decryption key from memory and write same to the filter of correlator 41. Next this user may input his fingerprint to characteristic input device 40. This will cause the correlator to return the key representing function to the processor 36 so that the processor may determine the key from this function. The decryption key may then be used to decrypt the incoming message.

In a similar fashion, the remote station user could encrypt a message by obtaining the decryption key in the manner aforedescribed and inputting a message to be encrypted at operator input 46. The encrypted message could then be decrypted by the base station in the same fashion as the remote station decrypts messages passed in the other direction.

The only difference between the base station and the remote station is the presence of random character generator 22 at the base station. The roles of these stations may be easily reversed by including a random character generator at the remote station.

Figure 2A:
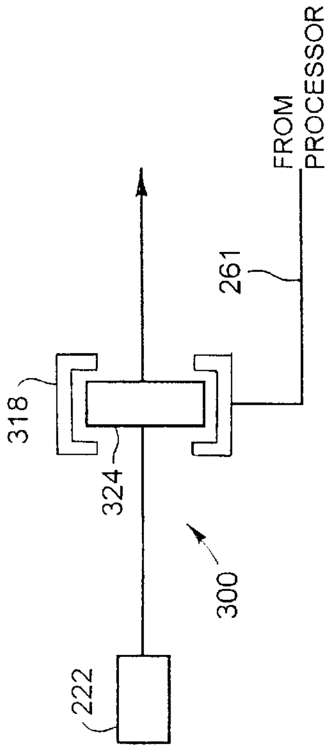
FIG. 2A is a schematic representation of an alternative embodiment for a portion of FIG. 2.

As described, the subject invention is suitable for use in secure communications between two computers where the decryption key is released only by applying the fingerprint of the proper user to an input device. Of course, the characteristic input device may be modified to accept other body parts of a user so that a different biometric, such as a vein structure, or an iris pattern of a user is input.

Where the base station user is an entity such as a corporation or other organization, it may not be desirable to have access controlled by a biometric of a single individual. FIG. 2*a* illustrates an alternative characteristic input device 300 which may be used in such instance. Turning to FIG. 2*a,* input device 300 comprises a SLM 324 held in place by holder 318 in the light path of coherent light source 222. Processor 16 writes a corporation's proprietary characteristic information (PCI) on the SLM 324 which impresses the light beam with selected characteristics such that a characteristic information signal is generated. When not in use, the PCI would be stored in a secure location in the corporation.

If the base station is sufficiently secure, it may be preferred to store an unencrypted version of the decryption key in memory 24. In such instance, correlator 21 becomes unnecessary and may be replaced with an imaging lens, CCD camera, and A\D convertor. The only use made of the base station characteristic input device would then be during generation of the encrypted decryption key.

System 10 has been described in conjunction with a decryption key which is a symmetric private key. Alternatively, the decryption key could be the private key for public key encrypted messages.

Certain parts of the subject invention have been described as using Fourier Transforms which are an expansion on a set of complex exponential orthogonal basis functions. Alternatively, other orthogonal expansions on a set of basis function can also be used such as Walsh and wavelet functions.

While the system of FIG. 1 has been described in conjunction with optical correlators 21, 41, it will be apparent to those skilled in the art that the correlators may be implemented digitally.

Other modifications will be apparent to those skilled in the art and, therefore, the invention is defined in the claims.

What is claimed is:

1. A method for permitting the secure passing of data between two remote stations, comprising the steps of:

obtaining from a user of a first of two remote stations, a first characteristic information signal;

obtaining from a user of a second of two remote stations, a second characteristic information signal;

generating a sequence of random characters to obtain a random key;

obtaining a key function which represents said key;

obtaining a Fourier transform of said key representing function;

obtaining at least one encrypted version of said key based on said Fourier transform of said key representing function, and a least one of said first characteristic information signal and said second characteristic information signal such that said key may be recovered by writing said at least one encrypted version of said encrypted key to a correlator and inputting either one of said first characteristic information signal and said second characteristic information signal to said correlator;

storing said at least one encrypted version of said key at each of said first station and said second station, whereby thereafter any message encrypted in such a way that it may be decrypted by said key may be decrypted at either of said two remote stations by retrieving said stored encrypted key, writing said at least one encrypted version of said encrypted key to a correlator and inputting either one of said first characteristic information signal and said second characteristic information signal to said correlator.

2. The method of claim 1 wherein the step of obtaining a first characteristic information signal comprises obtaining an optical beam modulated with a biometric image of a first body part of said user of said first station, registering said optical beam in a two-dimensional plane and digitizing said registered optical beam.

3. The method of claim 2 wherein the step of obtaining a second characteristic information signal comprises obtaining an optical beam modulated with a biometric image of a second body part of said user of said second station, registering said optical beam in a two-dimensional plane and digitizing said registered optical beam.

4. The method of claim 3 wherein the step of obtaining said key representing function comprises obtaining normalized orthogonal basis functions and, for each basis function, applying a character of said key as a co-efficient.

5. The method of claim 4 wherein said first characteristic information signal is obtained at said first station and including the steps of:

encrypting said digitized registered optical beam modulated with a biometric of a first body part with a pre-selected key to obtain an encrypted first biometric signal;

sending said encrypted first biometric signal to said second station;

utilizing said pre-selected key at said second station to decrypt said encrypted biometric of said first body part; and obtaining said encrypted key at said second station.

6. The method of claim 4 wherein said key representing function is obtained at said first station and including the steps of:

encrypting said key representing function with a pre-selected key to obtain an encrypted key representing function;

sending said encrypted key representing function to said second station;

utilizing said pre-selected key at said second station to decrypt said encrypted key representing function; and obtaining said encrypted key at said second station.

7. A method for the secure handling of data between two remote stations, comprising the steps of:

at a base station, encrypting a message such that said message may be decrypted by a decryption key;

passing said message to a remote station;

at said remote station, obtaining from a user of said remote station a remote station user optical characteristic information signal;

retrieving from storage an encrypted version of said decryption key, said encrypted decryption key having the property that when it is written to a correlator, the output of said correlator is similar when input with either one of said remote station user characteristic information signal or a base station user optical characteristic information signal;

writing a remote station correlator with said encrypted decryption key;

inputting said remote station correlator with a Fourier transform of said remote station user optical characteristic information signal;

regenerating said decryption key from an output of said remote station correlator; and decrypting said message with said decryption key.

8. The method of claim 7 wherein the step of encrypting a message at said base station comprises encrypting said message utilizing said decryption key.

9. The method of claim 8 wherein the step of encrypting a message at said base station comprises the steps of:

obtaining from a base station user said base station optical characteristic information signal, such that said base station optical characteristic signal is impressed with characteristics of a body part of said base station user;

retrieving from storage said encrypted version of said decryption key;

writing a base station correlator with said encrypted decryption key;

inputting said base station correlator with said base station user optical characteristic information signal;

regenerating said decryption key from an output of said base station correlator; and encrypting said message with said regenerated decryption key.

10. The method of claim 4 wherein said step of obtaining at least one encrypted version of said key is based on both said first characteristic information and said second characteristic information signal.

11. The method of claim 1 wherein each said correlator is a digital correlator.

12. The method of claim 7 wherein said remote station correlator is a digital correlator.

13. The method of claim 9 wherein said base station correlator is a digital correlator.

* * * * *